April 15, 1958     L. G. SIMJIAN     2,830,912
METHOD OF TENDERIZING FOOD
Original Filed June 11, 1953

LUTHER G. SIMJIAN
INVENTOR.

BY Ralph E. Bitner

ATTORNEY

United States Patent Office 2,830,912
Patented Apr. 15, 1958

2,830,912

METHOD OF TENDERIZING FOOD

Luther G. Simjian, Greenwich, Conn., assignor to The Reflectone Corporation, Stamford, Conn., a corporation of Connecticut Original application June 11, 1953, Serial No. 361,051. Divided and this application September 30, 1955, Serial No. 537,720

10 Claims. (Cl. 99—217)

This is a divisional application of my copending application for Letters Patent, Serial Number 361,051, filed June 11, 1953, now abandoned.

The present invention relates to a method and means for tenderizing food, making it more palatable and digestible. It has particular reference to the application of high frequency mechanical vibrations to food products which have been frozen to a rigid state.

It is well known that the toughness found in many cuts of meat is due to hard fibers which are present in the meat and which are not easily acted upon by the application of heat. It is also well known that certain types of fruit such as grapefruit and oranges are somewhat indigestible because of numerous tough fibers which are always present in certain varieties of this fruit. Meat may be tenderized by excessive mechanical manipulation by pounding with a hammer or other blunt objects. This method is not entirely successful and has the disadvantage of distorting the meat and squeezing out many of the meat juices. The present invention employs mechanical movement to break the tough fibers in the food but this is done when the food is in a rigid frozen state so that the shape of the article is not changed and none of the juices are lost. The mechanical vibration necessary is obtained by a transducer which is actuated by electrical energy to produce sound energy in the audible or inaudible frequency range.

One of the objects of this invention is to provide an improved food tenderizer which avoids one or more of the disadvantages and limitations of prior art arrangements.

Another object of the invention is to provide a structure for tenderizing food which is convenient and can be operated by inexperienced personnel.

Another object of the invention is to provide a food tenderizer which will consume a comparatively short time for the tenderizing operation.

Another object of the invention is to tenderize food while still frozen, thereby eliminating the possibility of food spoilage.

One feature of the invention includes a clamping device which may be clamped on to the end of a frozen portion of food. The clamping device is coupled to a transducer which applies powerful high frequency vibrations to the clamp and the food.

Another feature of the invention includes the method of submerging frozen food articles in a tank of liquid and then applying high frequency mechanical vibrations to the liquid.

A third feature of the invention comprises a multiple applicator which can be applied to irregular articles of food, such as frozen meat, and then applying magnetostrictive energy to each of the applicators by a source of high frequency energy.

For a better understanding of the present invention together with other and further objects thereof, reference is made to the following description taken in connection with the accompanying drawings.

Figure 1:
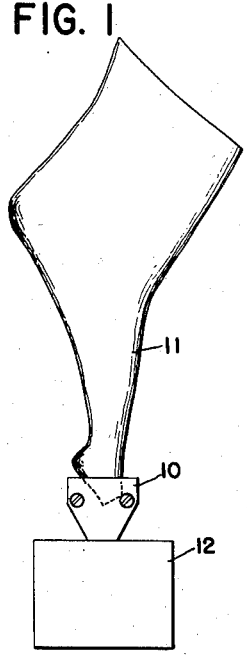
Fig. 1 is a side view of a portion of frozen meat held in a clamp.
Figure 2:
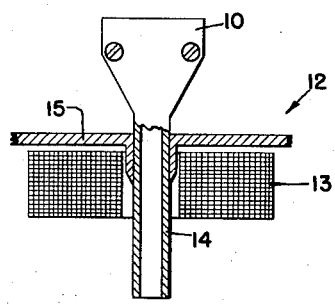
Fig. 2 is a detailed cross sectional view of the clamp arrangement and indicates one means for transforming high frequency electrical energy into vibrations which can be applied to large portions of meat.

Referring now to Figs. 1 and 2, an apparatus is illustrated by which the preferred method of tenderizing is performed. The tenderizer includes a clamp 10, which consists of two jaws, is arranged to securely hold a large piece of meat 11 by clamping to the lower portion which is largely bone structure. The meat 11 must be frozen so that it is rigid throughout its entire volume. The clamp 10 is secured to a megnetostrictive unit 12 which comprises a coil 13, to which is applied the high frequency energy, and a hollow shaft 14 made of nickel which extends through the center of the coil and is secured to a flat supporting piece 15. It is convenient and highly efficient to support the clamp 10 and its shaft 14 at a node which in this case is approximately the central part of the vibrating assembly. In this manner a strong support may be employed without cutting down the efficiency of the vibrating element.

Figure 3:
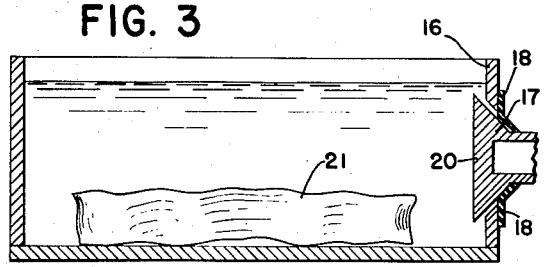
Fig. 3 is a sectional view of a tank for frozen food objects containing a transducer at one side thereof.

The device shown in Fig. 3 comprises a tank 16, open at the top, and containing an opening at one of its ends into which a transducer 17 is positioned. A rubber gasket 18 is secured to the outside of the tank and also to some part of the transducer so that liquid within the tank will not run out. The transducer 17 is similar to the one shown in Fig. 2 except it is formed with a flat end portion 20 instead of a clamp. The flat end portion 20 should have an area of at least 75 percent of the area of the side wall.

The tank is used as follows: An article of food 21 which is frozen to a rigid condition is placed in the tank and water or other suitable liquid is poured over it so as to completely cover the article of food and also to be above the topmost portion of the transducer face 20. Then high frequency energy is applied to the transducer 17 to cause it to vibrate and produce intense waves of compression and rarefaction within the liquid. These vibrations are transmitted to the food and the mechanical movement causes a splitting and breaking of the hard fibers within the food volume, thereby tenderizing it.

Figure 4:
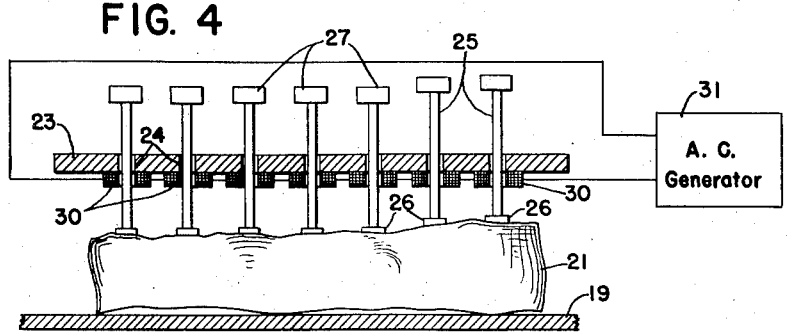
Fig. 4 is a sectional view of a multiple applicator for applying high frequency vibrations to a number of areas on a frozen food object.
Figure 5:
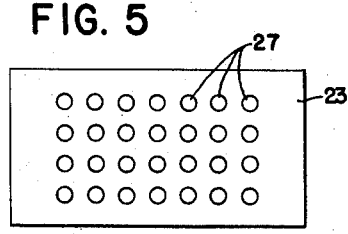
Fig. 5 is a plan view of the multiple applicator shown in Fig. 4 and shows the disposition of the applicators.

Figs. 4 and 5 indicate the manner in which a number of vibrating elements can be applied to an irregular object. A supporting plate 23 contains a number of holes 24 through which extend a plurality of nickel rods 25. The rods are supplied with small flat disks 26 for application to a portion of a food object 21 which is positioned below plate 23 and resting on plate 19. In order to insure a good and sufficient contact between the disks 26 and the article of food 21 each nickel rod is supplied with a weight 27 on its upper end. These weights, in addition to causing good contact with the food, act as a supporting node for the nickel rod. This means that the high inertia of the weights forces the nickel rods to expand and contract under magnetostrictive actuation so that only the ends with the disks vibrate.

Magnetostrictive actuation is supplied by a plurality of coils 30 which are secured to plate 23 and positioned adjacent to the holes 24 in that component. Each coil 30 contains a nickel rod 25 passing through a hole in the winding and when high frequency power is applied to these coils from any suitable generator 31 the coils will vibrate in a longitudinal direction. The coils 30 may be connected in series or parallel arrangement depending upon the impedance and power characteristics of source 31.

The above description shows only a transducer which is operated by a magnetostrictive device. However, any other type of transducer may be used, such as; an air pressure resonator, or a piezoelectric crystal, such as quartz or bariumtitanate, as long as sufficient power can be transmitted at the frequency of the applied electric wave.

While there have been described and illustrated specific embodiments of the present invention, it will be obvious that various modifications can be made without departing from the scope of the appended claims.

What is claimed is:

1. A method of tenderizing a normally deformable article of food comprising the steps of transforming said article from its original state to a substantially rigid state and subjecting the article to high frequency vibrations while in said substantially rigid state.

2. A method of tenderizing a normally deformable article of food comprising the steps of transforming said article by lowering its temperature from its original deformable state to a substantially rigid state and subjecting the article to high frequency mechanical vibrations while in said substantially rigid state.

3. A method of tenderizing a normally deformable article of food comprising the steps of transforming said article by lowering its temperature from its original deformable state to a substantially rigid state and then applying high frequency mechanical vibrations to one side of said article.

4. A method of tenderizing a normally deformable article of food comprising the steps of transforming said article by lowering its temperature from its original deformable state to a substantially rigid state and then applying high frequency mechanical vibrations to a plurality of areas on said article.

5. A method of tenderizing a normally deformable article of food comprising the steps of transforming said article by lowering its temperature from its original deformable state to a substantially rigid state, immersing portions of said article into a liquid medium, and subjecting said portions while in its substantially rigid state to high frequency vibrations applied through said liquid medium.

6. A method of tenderizing a normally deformable article of food comprising the steps of transforming said article by lowering its temperature from its original deformable state to a substantially rigid state and then subjecting the article to high frequency mechanical vibrations having an amplitude which is sufficient to break hard components in the article.

7. A method of tenderizing a normally deformable article of food comprising the steps of transforming said article from its original deformable state to a substantially rigid state by lowering its temperature and then applying high frequency mechanical vibrations to a plurality of areas on said article, said vibrations having an amplitude which is sufficient to break hard components in the article.

8. A method of treating a normally deformable article of food comprising the steps of transforming said article from its original state to a substantially rigid state and subjecting the article to vibrations within the range of audible and inaudible frequencies while in said substantially rigid state, said vibrations causing tenderization of said article.

9. A method of treating a normally deformable article of food comprising the steps of transforming said article by changing its temperature from its original deformable state to a substantially rigid state and then subjecting the article to energy within the range of audible and inaudible frequencies to cause tenderization of said article.

10. A method of treating a normally deformable article of food comprising the steps of transforming said article by lowering its temperature from its original deformable state to a substantially rigid state, immersing portions of said article into a liquid at a temperature for maintaining said article in its substantially rigid state, and subjecting portions of said article to vibrations within the range of audible and inaudible frequencies applied through said liquid medium to cause tenderization of said article.

References Cited in the file of this patent

UNITED STATES PATENTS 2,629,311     Graves _____ Feb. 24, 1953

FOREIGN PATENTS 1,592/31     Australia _____ July 28, 1931

OTHER REFERENCES

"Food Engineering," October 1953, p. 87, article entitled Ultrasonic Processing.